(12) United States Patent
Iturrospe Iregui et al.

(10) Patent No.: US 10,107,663 B2
(45) Date of Patent: Oct. 23, 2018

(54) DEVICE AND METHOD FOR MEASURING THE VOLUME OF A CAVITY

(71) Applicants: INGENET AUTOMATIZACION, S.L., Orozco (ES); Vidrala, S.A., Llodio (ES)

(72) Inventors: Aitzol Iturrospe Iregui, Eskoriatza (ES); Jose Manuel Abete Huici, Aretxabaleta (ES)

(73) Assignees: Ingenet Automatizacion, S.L., Orozco (ES); Vidrala, S.A., Llodio (ES)

( * ) Notice: Subject to any disclaimer, the term of this patent is extended or adjusted under 35 U.S.C. 154(b) by 240 days.

(21) Appl. No.: 15/055,014

(22) Filed: Feb. 26, 2016

(65) Prior Publication Data

US 2016/0195420 A1    Jul. 7, 2016

Related U.S. Application Data

(63) Continuation of application No. PCT/EP2014/066163, filed on Jul. 28, 2014.

(30) Foreign Application Priority Data

Sep. 3, 2013    (EP) .................................. 13382342

(51) Int. Cl.
*G01F 17/00* (2006.01)
*G01F 23/284* (2006.01)
(Continued)

(52) U.S. Cl.
CPC ............ *G01F 17/00* (2013.01); *G01F 23/284* (2013.01); *G01F 23/68* (2013.01); *G01S 13/88* (2013.01)

(58) Field of Classification Search
CPC ........ G01F 17/00; G01F 23/164; G01F 23/38; G01F 25/0061; G01F 23/0038;
(Continued)

(56) References Cited

U.S. PATENT DOCUMENTS

| 3,596,510 A | 8/1971 | Siegel et al. |
| 4,535,627 A * | 8/1985 | Prost ................. G01G 17/00 367/908 |

(Continued)

FOREIGN PATENT DOCUMENTS

| JP | H07190834 A | 7/1995 |
| JP | H09113332 A | 5/1997 |
| WO | 8603834 A1 | 7/1986 |

OTHER PUBLICATIONS

International Search Report and Written Opinion dated Oct. 10, 2014 in corresponding International Application PCT/EP2014/066163.

(Continued)

*Primary Examiner* — Randy Gibson
*Assistant Examiner* — Gedeon M Kidanu
(74) *Attorney, Agent, or Firm* — Edell, Shapiro & Finnan, LLC

(57) ABSTRACT

An apparatus for measuring the inner volume of a cavity. According to one embodiment the apparatus comprises a hollow body coupleable to the cavity, such that the inner volume of the cavity and the inner volume of the hollow body are communicated. A solid body is housed in the hollow body. A detector monitors the position of the solid body. A processor determines the inner volume of the cavity which is calculated from the oscillation of the solid body according to the volume of gas inside the cavity.

12 Claims, 3 Drawing Sheets

(51) Int. Cl.
*G01F 23/68* (2006.01)
*G01S 13/88* (2006.01)

(58) Field of Classification Search
CPC ........ G01F 23/18; G01F 23/284; G01F 23/68;
G01F 1/6842; G01F 1/692; G01F 23/00;
G01F 23/0007; G01F 23/2921; G01F
23/40; G01F 23/42; G01F 23/443; G01F
23/446; G01F 23/46; G01F 5/00; G01L
7/063; G01L 1/242; F02M 37/10; F02M
37/106
USPC .......................................................... 73/149
See application file for complete search history.

(56) References Cited

U.S. PATENT DOCUMENTS

| | | | | |
|---|---|---|---|---|
| 4,640,130 A | * | 2/1987 | Sheng | A61B 5/1073 73/149 |
| 4,713,966 A | * | 12/1987 | Thyren | G01F 17/00 73/149 |
| 5,203,203 A | * | 4/1993 | Bryan | G01N 11/12 73/54.19 |
| 5,606,135 A | * | 2/1997 | Eldridge | G01F 1/20 73/223 |
| 5,905,200 A | * | 5/1999 | Eldridge | G01F 1/056 73/202 |
| 6,703,635 B2 | * | 3/2004 | Yashiro | G01F 23/0038 250/577 |
| 7,353,704 B2 | * | 4/2008 | Clanton | G01F 23/42 242/615 |
| 2007/0193350 A1 | * | 8/2007 | Nishizu | G01F 17/00 73/149 |
| 2008/0210003 A1 | * | 9/2008 | Schulz | G01F 23/284 73/290 V |

OTHER PUBLICATIONS

European Search Report dated Jan. 24, 2014 in corresponding European Application No. 13382342.7-1554.

* cited by examiner

DEVICE AND METHOD FOR MEASURING THE VOLUME OF A CAVITY

CROSS-REFERENCE TO RELATED APPLICATIONS

This application relates to and claims the benefit and priority to International Application No. PCT/EP2014/066163, filed Jul. 28, 2014, which relates to and claims the benefit and priority to European Patent Application No. 13382342.7, filed Sep. 3, 2013.

TECHNICAL FIELD

The present invention is related to devices for measuring the volume of a cavity and to methods for measuring the volume of a cavity.

BACKGROUND

Devices and methods for measuring the volume of a cavity are known. Many of said devices and methods use the Helmholtz resonator principle for determining the volume of gas inside the cavity. This principle, which has an apparently simple basis of application, is based on coupling a resonator, generally a tube, in fluid communication with the cavity the volume of which is to be known. The tube and cavity are filled with a gas, usually air, and the volume of gas located inside the tube is oscillated by means of a blower. The system formed by the gas of the tube and the gas of the cavity is represented as a system having one degree of freedom, in which the gas of the tube behaves like a mass oscillating on the gas of the cavity, the cavity behaving like a spring.

Devices applying the Helmholtz principle comprise means that allow determining the resonance frequency of the cavity. Considering that the process carried out is adiabatic, the volume V of the cavity is obtained according to formula:

$$V = A \cdot c^2 / 4 \cdot \pi^2 \cdot f \cdot l$$

wherein,
A is the area of the cross section of the tube,
c is the speed of sound in the medium where the measurement is taken,
f is the resonance frequency of the cavity the volume of which is to be measured, and
l is the length of the tube.

Patent application JP7083730 A describes a device for measuring the inner volume of a cavity applying the Helmholtz resonator principle and comprising a hollow body coupleable to said cavity, such that the inner volume of the cavity and the inner volume of the hollow body are communicated.

SUMMARY OF THE DISCLOSURE

One aspect of the disclosure is related to a device for measuring the inner volume $V_1$ of a cavity, comprising a hollow body coupleable to said cavity, such that the inner volume $V_1$ of the cavity and the inner volume of the hollow body are communicated. The device also comprises a solid body housed in the hollow body, detection means/detector for detecting the position of said solid body, and processing means/processor for determining the inner volume $V_1$ of the cavity from the oscillation of the solid body according to the volume of gas inside the cavity.

Another aspect is related to a method for measuring the inner volume $V_1$ of a cavity, wherein said inner volume $V_1$ is calculated from the oscillation of the solid body according to the volume of gas inside said cavity.

Unlike devices and methods applying the Helmholtz resonator principle, the device and methods disclosed herein use a solid body and not a gaseous body. Said solid body is oscillated, said oscillation is measured and the measurements are processed for obtaining the inner volume of the cavity.

In applications based on the Helmholtz resonator principle, the volume of the cavity is a function of the speed of sound c of the medium where the measurement is taken, and said applications presents many problems for maintaining said value of c constant. This is because the speed of sound c is sensitive to temperature and humidity variations. For example, when manufacturing glass bottles, the inner volume of which is to be measured, temperature and humidity are variables that considerably affect precision of the measurement of the volume of said bottles. By using the device and method disclosed herein, the mass of the solid body is not affected by temperature and humidity changes while oscillation is measured and volume is subsequently measured, and the calculation of the volume is much more precise. The measurement of the oscillation of the solid body is more precise with respect to the measurement of the oscillation of the gaseous body inside a tube, preventing problems relating to interference with the gas of the cavity, higher precision in calculating the inner volume of the cavity also being obtained for this reason.

These and other advantages and features will become evident in view of the drawings and the detailed description.

DETAILED DESCRIPTION

Figure 1:
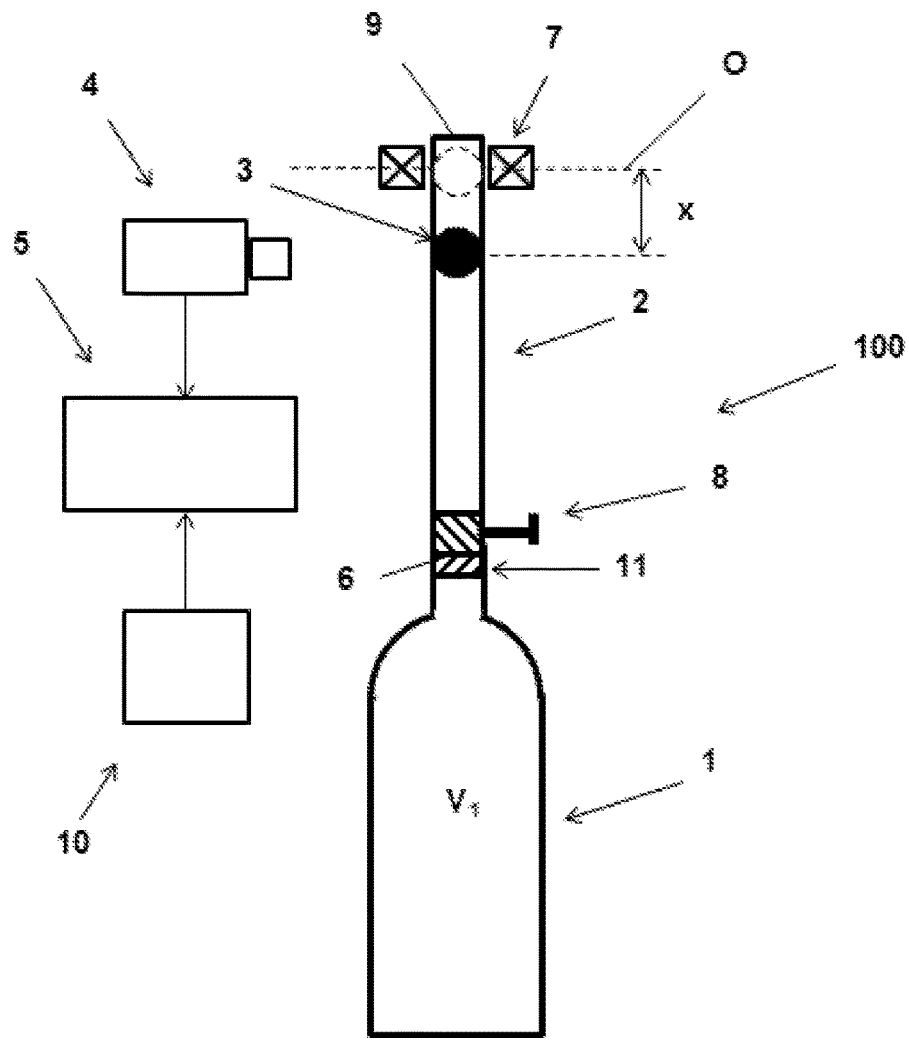
FIG. 1 shows a schematic elevation view of a device for measuring the inner volume of a cavity according to one embodiment.

Devices for measuring the inner volume of a cavity are used when manufacturing glass bottles, for example. In the glass bottle manufacturing process, glass is melted and then bottles are molded. The bottles leave the molding process in a very hot state, at about 400° C., and accumulate on the production line to gradually cool down. When the bottle cools down, samples are periodically taken to the laboratory to measure their inner volume. There are devices that take said measurement, but these devices use water and have considerably long measurement cycle times to attain certain precision.

An alternative to said devices could be devices that apply the Helmholtz resonator principle, but said devices are very sensitive to temperature and humidity.

An embodiment of the device 100 of the invention which solves the problems mentioned above is shown in FIG. 1. Said device 100 used for measuring the inner volume $V_1$ of a cavity 1 comprises a hollow body 2 coupleable to said cavity 1. Said hollow body 2, which is a cylindrical tube in the embodiment of the device 100 shown in FIG. 1, has two ends, an end 6 coupled to the cavity 1 and an end 9. End 6 is open and allows communication of the inner volume of the hollow body 2 with the inner volume $V_1$ the cavity 1. End 9 in the embodiment shown is open, but in another embodiment of the device 100 it can be closed.

The device 100 also comprises a solid body 3 which is housed in the hollow body 2, said solid body 3 having a spherical geometry in this embodiment. This solid body 3 is located inside the hollow body 2, which is a cylindrical tube, fitted against its walls, being able to slide. To be able to measure the inner volume $V_1$, the solid body 3 must initially be fixed in an initial position O, for which purpose the device 100 comprises fixing means/retainer 7. The fixing means/retainer 7 is formed as a unit with the hollow body 2, such that it always maintains the same relative distance with respect to the hollow body 2, and therefore the initial position O is always the same. The fixing means/retainer 7 can be an electromagnet or other means that allows fixing and maintaining the initial position O of the solid body 3.

The device 100 comprises detection means/detector 4 for detecting the position of said solid body 3. When said solid body 3 comes out of its initial position O, the solid body oscillates as it falls, and the detection means/detector determine the instantaneous position x of said solid body 3 during oscillation over time. Said instantaneous position x over time is converted by the detection means/detector 4 into signals that can be emitted, said signals being received by processing means/processor 5 comprised in the device 100. The detection means/detector 4 can be a camera, or a laser, or an inductive system, or any other means which allows sensing the instantaneous position x of the solid body 3 during its oscillation.

The device 100 also comprises pressure balancing means 8 for balancing pressure with the atmospheric pressure. To measure the inner volume $V_1$ of the cavity 1, the inner volume comprised in the hollow body 2 and the inner volume $V_1$ of the cavity 1 are filled with a specific gas, which can be air. In the embodiment of the device 100 shown in FIG. 1, the end 9 of the hollow body 2 is outwardly open, and the pressure balancing means 8 is a valve arranged in the hollow body 2 between the solid body 3 and the end 6 which is coupled to the cavity 1. When the inner volume $V_1$ of the cavity 1 is going to be measured, the solid body 3 is arranged in the initial position O and the pressure balancing means 8 are opened, such that the solid body 3 would be subjected to atmospheric pressure Pa in its position on both sides in the hollow body 3. In another embodiment of the device 100 (not shown in the drawings), the end 9 of the hollow body 2 is closed, so in the inner volume of the hollow body 2 and in the inner volume $V_1$ of the cavity 1 there will be a specific pressure of the gas filling it. In said embodiment, instead of pressure balancing means 8, means that can measure the pressure of the gas on both sides of the solid body 3 when it is in the initial position O are included, and can comprise means that allows balancing the pressure of the gas on both sides.

The measurement cycle time of the inner volume $V_1$ of the cavity 1 is short enough to consider that the process taking place is adiabatic, because when the solid body 3 moves during oscillation, it causes rapid changes in the inner volume V. It can therefore be assumed that the change in volume that occurs is proportional to the pressure variation in the cavity 1. The adiabatic index Y of the gas, which is air in the embodiment shown, is related to the specific heat of said air at constant pressure, and the specific heat of the air at constant volume. This adiabatic index Y depends on temperature T and humidity H, so the device 100 shown also comprises monitoring means/monitor 10 for measuring and monitoring temperature T, humidity H, and also atmospheric pressure Pa values of the site where the inner volume $V_1$ of the cavity 1 is measured. Said T, H, and Pa values measured are converted by the monitoring means/monitor 10 into signals that can be emitted, said signals being received by the processing means/processor 5 of the device 100. The monitoring means/monitor 10 can be a barometric station.

The device 100 of FIG. 1 also comprises coupling means/coupler 11 between the hollow body 2 and the cavity 1 which allow proper coupling between the end 6 of the hollow body 2 and the open end of the cavity 1, thereby achieving proper alignment between both bodies and preventing gas leaks from inside the assembly formed by the hollow body 2 and the cavity 1 to the outside. The coupling means/coupler can be formed by flanges or other means performing a similar function.

When the inner volume $V_1$ of the cavity 1 is going to be measured, the solid body 3 is arranged so that it oscillates from the initial position O, said oscillation depending on the volume of gas inside the cavity 1 and on the volume of gas of the hollow body 2 between the initial position O and the end 6. This volume of gas in the hollow body 2 is constant regardless of the changes of the inner volume $V_1$ that may occur between different units of the same type of cavity 1. The detection means/detector 4 sends signals of the instantaneous position x of said solid mass in oscillation to the processing means/processor 5. Likewise, the monitoring means/monitor 10 sends temperature T, humidity H, and atmospheric pressure Pa signals to the processing means/processor 5.

Said processing means/processor 5 processes the signals and determine a volume V as the sum of the inner volume $V_1$ of the cavity 1 and of the inner volume $V_2$ of space comprised in the hollow body 2, between the initial position O and the end 6, according to formula:

$$V = Y * A^2 * P * T^2 / 4 * \pi^2 * m$$

and determine the inner volume $V_1$ of the cavity 1 according to formula:

$$V_1 = V - V_2$$

wherein,

Y is the adiabatic index of the gas filling the inside of the volume V,

A is the area of the cross section of the hollow body 2,

P is the pressure of the gas taking up the volume V,

T is the instantaneous period of each balanced position of the solid body 3 during oscillation, and m is the mass of the solid body 3.

The device 100 shown in FIG. 1 is in the vertical position, and the solid body 3 starts to oscillate from the initial position O when the action of the fixing means/retainer 7 is interrupted, falling due to the action of gravity. However, in other embodiments of said device 100 (not shown in the drawings), said device 100 could have different degrees of inclination with respect to the vertical direction, even being able to be in the horizontal position, in which case the solid body could also be moved by driving means other than gravity. In this latter case, the fixing means/retainer 7 could also perform driving means functions, moving the solid mass 3 towards the cavity 1 to start oscillation, but it can also be different driving means performing said function.

Another aspect is related to a method for measuring the inner volume $V_1$ of a cavity 1. Said inner volume $V_1$ is calculated from the oscillation of a solid body 3 according to the volume of gas inside said cavity 1 because both magnitudes are related to one another. In the example of manufacturing glass bottles, each type of bottle has a shape and size giving it a different inner volume $V_1$. Since there are many different bottle types, the oscillation of the solid body 3 will differ as the amount of gas in said cavities of the bottles is different. Therefore, it is necessary to have a method that assures precision and repeatability of the measurement of the inner volume $V_1$, regardless of environmental conditions, of differences in volumes to be measured, and with a quick enough measuring time.

According to one embodiment the method is implemented, for example, in a device 100 such as the one shown in FIG. 1, suitable for measuring the inner volume $V_1$ of a cavity 1. Said device 100 comprises a hollow body 2, in this embodiment a cylindrical tube, coupleable to the cavity 1, such that the inner volume $V_1$ of the cavity 1 and the inner volume of the hollow body 2 are in fluid communication. The solid body 3, which is a sphere in this embodiment, is housed in said hollow body 2 fitted against its walls, being able to slide. The device 100 also comprises fixing means/retainer 7, integral with the hollow body 2, that allows fixing the solid body 3 in an initial position O, detection means/detector 4 for detecting the position of said solid body 3, and processing means/processor 5 for determining the inner volume $V_1$ of the cavity 1 from the oscillation of the solid body 3.

Figure 2:
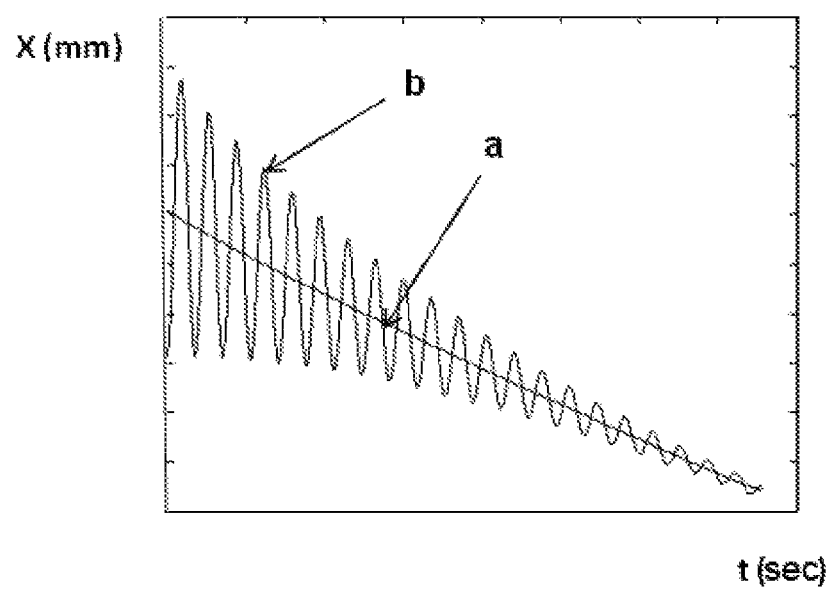
FIG. 2 shows a graph representing an example of the movement of the solid body during oscillation in the device of FIG. 1 with respect to time.

According to one embodiment the method comprises the steps of:
a) Positioning the solid body 3 in an initial position O with the fixing means/retainer 7.
b) Measuring the instantaneous position x of the solid body 3 during oscillation with the detection means/detector 4. This measurement is taken over the time that the measurement cycle lasts as the solid body 3 is released from the initial position O and said solid body 3 starts to oscillate with respect to a volume of gas V filling the space comprised by the inner volume $V_1$, and an inner volume $V_2$ of the hollow body 2 comprised between the initial position O and an end 6 coupled with the cavity 1. As shown in FIG. 2, the solid body 3 performs oscillation b over time around a balanced position a, and at the same time it slides along the hollow body 2.
c) Calculating the period T corresponding to the balanced position a of the solid body 3 during oscillation b with the processing means/processor 5. FIG. 2 shows a graph representing the movement of the solid body 3 during oscillation b in the device 100 of FIG. 1 with respect to time. It is an embodiment with a device 100 to which there has been coupled a cavity 1 the inner volume $V_1$ of which is to be known, and in which a specific solid body 3 oscillates. Said oscillation b is detected by the detection means/detector 4 in the preceding step of the method by measuring the instantaneous position x. The processing means/processor process the signals received from the measuring means 4 and determine the oscillation curve b. Said curve is of the "cos (wt+θ)" type with sliding along the X axis.

The oscillation curve b increases it frequency over time. The reason for this increase is based on that fact that due to sliding, the volume V on which the solid body 3 oscillates decreases. The system formed by the solid body 3 and the gas filling the volume V is represented as a system having one degree of freedom, in which the solid body 3 behaves like a mass oscillating on the gas of the volume V, the latter behaving like a spring. In a system of this type, the frequency is inversely proportional to the volume of gas V, such that as V decreases, the oscillation frequency of the solid body 3 increases throughout the measurement cycle.

The processing means/processor 5, with the signals received from the detection means/detector 4, determine the balanced position a of the solid body 3 over time, as shown in FIG. 2. Said processing means/processor 5 allows adjusting the oscillation curve b which is of the "cos (wt+θ)" type, adjusting the variables θ and w over time, by means of known and used algorithms such as least squares fitting or by means of using Bayesian adaptive filters, and they allow knowing the instantaneous frequency $f_i$ for the balanced position a of the solid body 3. Once said instantaneous frequency $f_i$ is known, the relationship between frequency and period is known, said relationship being:

$$T=1/f_i$$

thereby being able to calculate the period T corresponding to the balanced position a of the solid body 3 during oscillation b.
d) Calculating the volume V according to formula:

$$V=Y*A^2*P*T^2/4*\pi^2*m$$

and,
e) Calculating the inner volume $V_1$ of the cavity 1 according to formula:

$$V_1=V-V_2$$

the inner volume $V_2$ of the hollow body 2 comprised between the initial position O and an end 6 coupled with the cavity 1 being a known value. The hollow body 2, which is a cylindrical tube in the embodiment shown in FIG. 1, comprises the two ends 6 and 9 and has a pre-established length as it is used invariably for measuring the different cavities 1, or in the example of glass bottles, at least for each type of bottle the volumes of which is to be measured. Therefore, once the initial position O from which the oscillation of the solid body 3 begins is established, the inner volume $V_2$ can be established.

The method can also comprise a calculation step for calculating the initial position O of the cavity 1 after the positioning step. When the inner volume $V_1$ of the same type of cavity 1 is always measured, this step makes no sense because once said initial position O is established, it is maintained constant. However, if there are different cavities the volume of which are to be known, the initial position O of each cavity can be different, in which case the processing means/processor 5 can calculate each new initial position O by knowing the length of the hollow body 2 and the length of each type of cavity.

In the device 100 shown in FIG. 1, the hollow body 2 has the end 9 outwardly open. In an embodiment in which the inner volume $V_1$ of the cavity 1 is being measured by extracting the solid body 3 from the hollow body 2 in each cycle, for example to clean said hollow body 2, the pressure on both sides of the solid body 3 when it is in the initial position O is atmospheric pressure Pa. In this case, the calculation of the inner volume $V_1$ of the cavity 1 is performed with the steps described above. However, if the measurement cycle is to be automated, the device 100 can comprise pressure balancing means 8. In this embodiment, the method of the invention comprises a determining step for determining the pressure after the positioning step. With the end 9 of the hollow body 2 open, the pressure balancing means 8 can be a valve, such that in the determining step for determining the pressure, the valve opens after positioning the solid body 3 in the initial position O and the pressures on both sides of the solid body 3 are therefore balanced. Then the valve closes and the method continues in the following step. In another embodiment of the device 100, the end 9 of the hollow body 2 can be closed, and the hollow body 2 and the cavity 1 are filled with gas at a specific pressure P. In this embodiment, the pressure balancing means 8 can be a valve connected to gas filling means and measuring means for measuring the pressure of the gas on both sides of the solid body 3. In the determining step for determining the pressure, this embodiment determines the pressure on both sides of the solid body 3 with which the inner volume $V_1$ of the cavity 1 is to be measured.

Depending on the environmental conditions in which the measurement of the inner volume $V_1$ of the cavity 1 is taken, or if for each measurement of said inner volume $V_1$ of the cavity 1 several measurement cycles are performed to increase the precision of the calculation performed, the adiabatic index Y of the gas filling the inside of the volume V can experience a change. In said situation, or if for the sake of greater accuracy said adiabatic index Y is to be calculated, the method can calculate said index Y with the aid of temperature T and humidity H parameters. When the gas filling the volume V is air, in one embodiment of the device 100, the adiabatic index Y can be calculated using known tables, which tables can be found in a memory of the processing means/processor 5. However, in another embodiment the device 100 can comprise monitoring means/monitor 10 used for measuring and monitoring the temperature T, humidity H, and atmospheric pressure Pa values of the site where the inner volume $V_1$ of the cavity 1 is measured. In this case, the method comprises a calculation step, after the measuring step, for calculating the adiabatic index Y of the gas filling the inside of the volume V.

Figure 3:
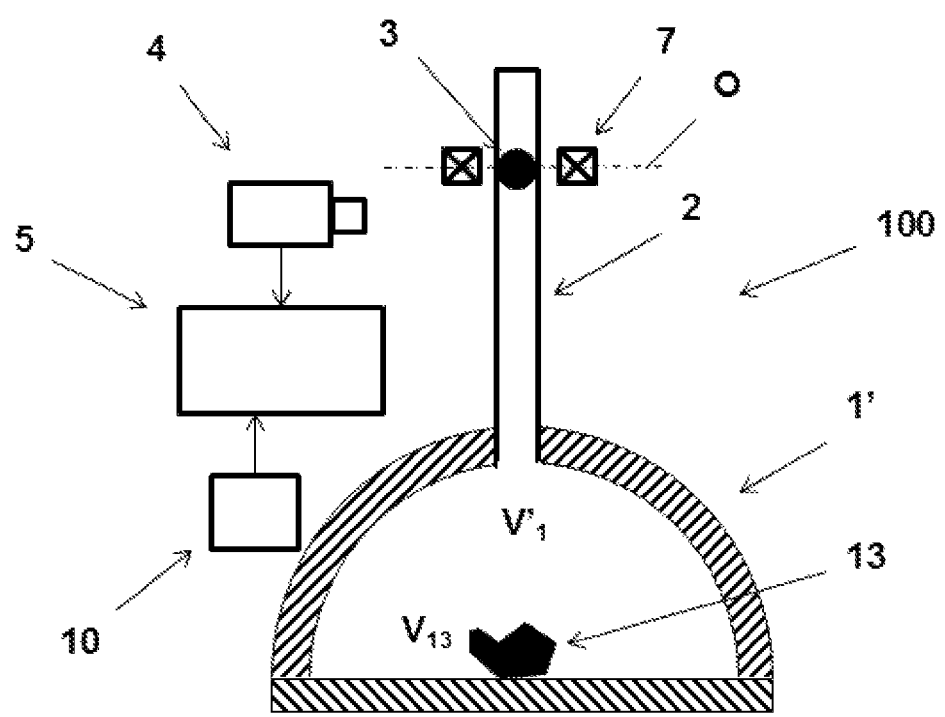
FIG. 3 shows a schematic elevation view of the embodiment of the device of FIG. 1 for measuring the volume of an object arranged inside a cavity.

Up until now, the method has been described for measuring the inner volume $V_1$ of a cavity 1, but it can also be used indirectly for measuring the volume $V_3$ of an object 13. FIG. 3 shows a schematic elevation view of the device 100 in which the hollow body 2 is coupled to the cavity 1', the inner volumes of both bodies being communicated.

The device 100 implementing the method can comprise the means comprised in the embodiment of the device 100 of FIG. 1. Neither the means for determining pressure 8 nor the coupling means/coupler 11 have been depicted for the sake of simplification. The method can include a calculation step for calculating the volume $V_{13}$ of the object 13 after the calculation step for calculating the inner volume $V_1$ of the cavity 1'.

The object 13 is arranged inside the cavity 1'. This cavity 1' is a predefined cavity the inner volume $V'_1$ of which is known. When introducing the object 13 inside the cavity 1', the volume $V'_1$ of this cavity 1' is reduced by the volume $V_{13}$ of the object 13. The free volume left in the cavity 1' is a volume $V_1$ that can be calculated with the method and device 100 described above. In this calculation step for calculating the volume $V_{13}$ of the object 13, said volume $V_{13}$ is calculated according to formula:

$$V_{13}=V'1-V1$$

wherein,
V'1 is a known inner volume of the cavity 1, and
V1 is the free inner volume of the cavity 1.

What is claimed is:

1. An apparatus for measuring inner volume $V_1$ of a cavity filled with a gas, the apparatus comprising:
   a hollow body having an inner volume filled with the gas, the hollow body coupleable to the cavity such that the inner volume $V_1$ of the cavity and the inner volume of the hollow body are in fluid communication,
   a solid body housed in the hollow body and configured to fall inside the hollow body from a first position to a second position while oscillating on the gas inside the hollow body around a balanced position,
   a detector for detecting the position of the solid body as the solid body falls from the first position to the second position, the detector configured to determine the instantaneous position of the solid body while the solid body oscillates, the detector configured to produce signals indicative of the instantaneous positions; and
   a processor configured to receive the signals from the detector and to process the signals to determine the inner volume $V_1$ of the cavity from the formulas:

$$V=Y*A^{2*}P*T^2/4*\pi^{2*}m$$

$$V_1=V-V_2$$

wherein,
   $V_2$ is a known inner volume of a space comprised in the hollow body between the first and second positions,
   V is a volume corresponding to the sum of the inner volume $V_1$ of the cavity and of the inner volume $V_2$,
   Y is an adiabatic index of the gas,
   A is an area of the cross section of the hollow body,
   P is a pressure of the gas,
   T is an instantaneous period of each of the balanced positions of the solid body during oscillation, and
   m is a mass of the solid body.

2. The apparatus according to claim 1, further comprising a retainer that is configured to retain the solid body in the first position and to release the solid body so that the solid body falls from the first position to the second position.

3. The apparatus according to claim 1, further comprising a pressure balancing means for balancing the pressure of the gas located in the hollow body between the first and second positions of the solid body.

4. The apparatus according to claim 1, further comprising means for determining the pressure of the gas located in the hollow body between the first and second positions.

5. The apparatus according to claim 1, further comprising a monitor configured to measure an ambient temperature, a humidity, and an atmospheric pressure at a location of the cavity, the monitor configured to transmit signals indicative of the measured temperature, humidity and atmospheric pressure to the processor, the processor configured to determine the value of the adiabatic index Y using the measured temperature, humidity and atmospheric pressure.

6. The apparatus according to claim 1, wherein a gas tight seal exists between the hollow body and the cavity.

7. The apparatus according to claim 1, further comprising driving means for causing the solid body to oscillate.

8. A method for measuring inner volume $V_1$ of a cavity filled with a gas, by use of an apparatus comprising a hollow body having an inner volume filled with the gas and that is in fluid communication with the inner volume $V_1$ of the cavity, a solid body housed in the hollow body, a retainer configured to retain the solid body in a first position, a detector configured to detect the position of the solid body, and a processor configured to determine the inner volume $V_1$ of the cavity from an oscillation of the solid body in the hollow body, the method comprising:
   causing the solid body to fall inside the hollow body from the first position to a second position while oscillating on the gas inside the hollow body;
   while the solid body falls from the first position to the second position, measuring by use of the detector an instantaneous position of the solid body as the solid body oscillates on the gas in the hollow body, determining a balanced position of the solid body over a time during which the solid body oscillates while falling from the first position to the second position in the hollow body, and calculating a period T corresponding to the balanced position during oscillation and calculating the volume $V_1$ according to formulas:

$$V = Y * A^2 * P * T^2 / 4 * \pi^2 * m$$

$$V_1 = V - V_2$$

wherein, $V_2$ is a known inner volume of a space comprised in the hollow body between the first and second positions, V is a volume corresponding to the sum of the inner volume $V_1$ of the cavity and of the inner volume $V_2$, Y is an adiabatic index of the gas, A is an area of the cross section of the hollow body, P is a pressure of the gas, and m is a mass of the solid body.

9. The method according to claim 8, further comprising balancing the pressure of the gas located in the hollow body between the first and second positions of the solid body.

10. The method according to claim 8, further comprising measuring the the pressure of the gas located in the hollow body between the first and second positions of the solid body.

11. The method according to claim 8, further comprising measuring a temperature, a humidity, and an atmospheric pressure at a location of the cavity followed by calculating the adiabatic index Y of the gas.

12. The method according to claim 8, further comprising:

arranging an object of volume $V_{13}$ inside the cavity, calculating a free inner volume $V'_1$ of the cavity with the objected arranged therein according to the formulas;

$$V' Y * A^2 * P * T^2 / 4 * \pi^{2*} m$$

$$V'_1 = V' - V_2$$

and calculating the volume $V_{13}$ of the object according to the formula:

$$V_{13} = V_1 - V'_1$$

wherein,

V' is a volume corresponding to the sum of the inner volume $V'_1$ of the cavity and of the inner volume $V_2$.

* * * * *